Dec. 14, 1954 J. W. GIFFIN 2,697,000
TUBING GRIPPER
Filed Sept. 19, 1952

INVENTOR.
JOHN W. GIFFIN,
BY
McMorrow, Berman + Davidson
ATTORNEYS.

2,697,000

TUBING GRIPPER

John W. Giffin, Hoisington, Kans.

Application September 19, 1952, Serial No. 310,483

4 Claims. (Cl. 294—16)

This invention relates to a device for handling lengths of tubing.

Summarized briefly, the device is a relatively small article to be grasped by the hand, the article being adapted to be extended into engagement with one end of a length of tubing, for the purpose of permitting the tubing to be lifted and handled with facility.

The device constituting the present invention is believed to be usable in any of various fields of work, but is particularly adapted for use in oil fields, wherein elongated, heavy lengths of tubing must be handled almost constantly. For example, when tubing is being removed from a well, each length of tubing, after being drawn out of the ground, must be uncoupled from the length immediately below the same, after which the disconnected length must be grasped by one or more workmen, and moved to an adjacent pipe rack.

Ordinarily, the workmen handle the lengths of tubing by grasping the disconnected sections with their hands, and it will be appreciated that this is to be avoided if possible, since the tubing is difficult to handle in excessively cold weather, or at times when the tubing is wet.

In view of the above, one important object of the present invention is to provide a gripper or handling device for tubing which is so formed as to have a portion thereof adapted for extension into the conventional coupling provided upon the end of the tubing, the device having another portion cooperating with the coupling-engaging portion, to exert pressure against the side wall of the tubing, thereby to facilitate movement of the tubing to an adjacent pipe rack.

Another object of the invention is to provide a device of the type stated wherein the portion thereof that extends into the coupling is so formed as to prevent damage to the interior threads of the coupling.

Still another object is to provide a device of the character referred to which is adapted for handling pipes or tubes varying in diameter from one another.

Still another object is to provide a device of the type stated wherein that end of the same remote from the tubing-engaging portion will be so formed as to guard the hand of the user, said end also being of rounded formation to permit it to slide upon the ground.

Yet another object is to provide a handler for oil well pipe sections wherein will be embodied a saddle member adapted to extend transversely across and exert pressure against the side wall of a length of tubing, said saddle member having removable, serrated plates which can be readily replaced.

Yet another object is to provide a device of the type stated which can be manufactured at relatively low cost, which has no moving parts, and will be of rugged construction.

Other objects will appear from the following description, the claims appended thereto, and from the annexed drawing, in which like reference characters designate like parts throughout the several views, and wherein:

Figure 1:
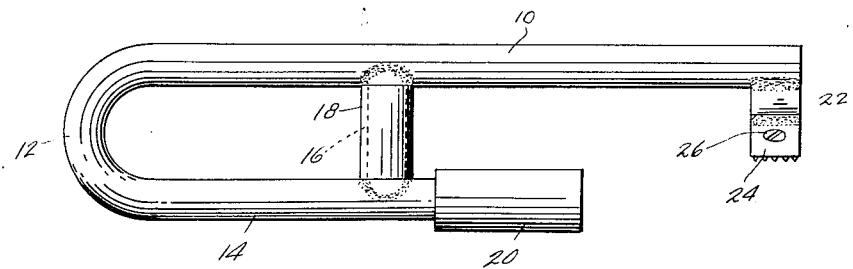
Figure 1 is a side elevational view of a tubing gripper formed in accordance with the present invention.
Figure 2:
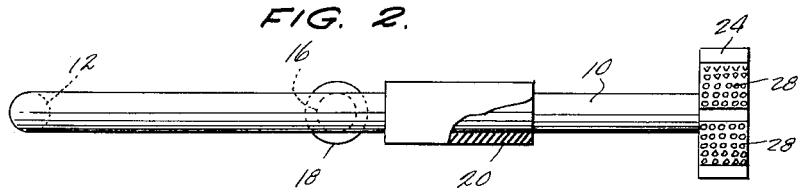
Figure 2 is a bottom plan view in which a portion is shown in section.

A single length of solid bar material of circular cross sectional shape is bent to form an elongated, straight upper shank 10 merging at its inner end into a curved bight 12, said bight extending through one hundred and eighty degrees of a circle, the bight 12 in turn merging into a straight bottom shank 14, the bottom shank being extended in spaced, parallel relation to the upper shank 10, but being shorter in length than the length of the upper shank.

That end of the device at which the bight 12 is located can be termed the outer end of the gripper, and it will be seen that the bight 12 cross braces the gripper at said outer end, while at the same time providing a rounded portion which can be slidably engaged with the ground surface, during the handling of a length of oil well tubing.

Intermediate the opposite ends of the upper shank 10, there is provided a cross bar 16, said cross bar being disposed normally to the longitudinal axes of the upper and lower shanks, and being welded at its opposite ends to said shanks. The cross bar 16 is spaced a substantial distance from the bight 12, and is spaced inwardly from the free end of the lower shank 14.

Circumposed about the cross bar 16 is a sleeve 18 of resilient material, such as rubber, said sleeve being utilized to prevent damage to the outer end of a coupling C (see Figure 4) should the tool be applied to a length of tubing T with excessive roughness. It is important, it may be noted, that a coupling such as that shown in Figure 4 not be damaged, since injury to the coupling may prevent future use thereof, requiring replacement of the coupling with an attendant loss of time.

Fitted upon the free end of the lower shank 14 is a cylindrical pad 20, said pad 20 being of rubber or other relatively soft, resilient material. Again, the use of a soft rubber pad 20 upon the free end of the lower shank 14 serves to prevent damage to the coupling, the construction illustrated and described being one which is effective in insuring preservation of the interior coupling threads.

Welded to the underside of the upper shank 10, at the free end of the shank, is a cylindrical, solid spacer 22, said spacer being in turn welded to the midlength portion of an arcuate saddle 24 extended transversely of the upper shank. The saddle 24 is formed, adjacent opposite ends thereof, with screw-receiving openings, in which are inserted screws 26 or equivalent fastening elements, said screws serving to connect a pair of serrated plates 28 to the underside of the saddle.

Figure 3:
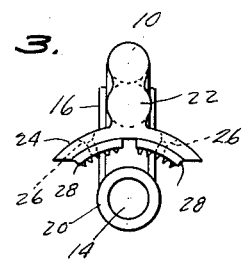
Fig. 3 is an end elevational view, the gripper being shown as it appears from the right in Figure 1.

The plates 28, as shown in Figure 3, are curved correspondingly to the curvature of the saddle 24, the plates being spaced apart longitudinally of the saddle, that is, transversely of the upper shank.

The construction shown is designed to permit substitution of the plates 28, whenever said plates become worn. Additionally, it is considered to be within the spirit of the invention to provide various sets of removable plates 28, said sets being formed for engagement with tubings of different diameters. Thus, the plates 28 can be of various thicknesses, and the curvatures of the tubing-engaging surfaces thereof can be selected, for accommodating the plates to the transverse curvature of particular types of tubing.

In use of the device, the upper shank 10 is gripped as a handle, the upper shank being so proportioned as to length as to permit one to grasp the same with both hands. The hands, as will be observed, are effectively protected, since they are substantially enclosed by the upper and lower shanks, and by the bight 12 and cross bar 16.

In an oil well operation, usually the length of pipe tubing to be laid upon a rack is suspended vertically, and it will be seen that the workman is enabled to extend the cushioned free end of the lower shank 14 into the lower end of the length of tubing to be moved.

Figure 4:
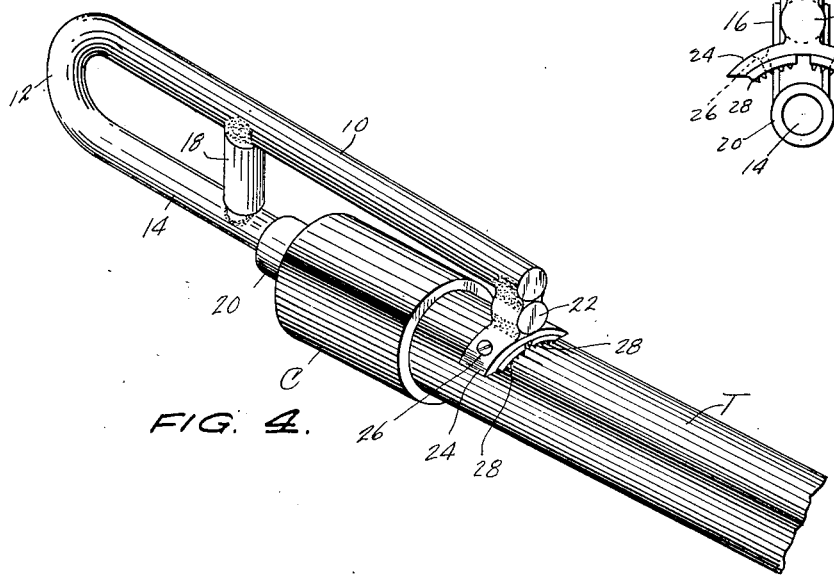
Figure 4 is a perspective view showing the gripper as it appears when in use.

When the workman has inserted the cushioned end of the shank 14 into the tubing, he is enabled to swing the tubing outwardly, and when the tubing has reached a substantial horizontal position, the saddle 24 will engage the upper surface of the tubing, in the manner shown in Figure 4. Another workman, equipped with an identical device, can handle the opposite end of the length of tubing, thereby facilitating movement of the tubing to an adjacent pipe rack.

The particular formation of the parts is such as to permit tubings of varying diameters to be handled, by a single gripper. It will be observed, in this regard, that the cylindrical pad 20 might be substantially smaller in respect to its exterior diameter, than the inner diameter of a coupling C or a length of tubing T. Even in such instances, the tubing is effectively gripped, since the shank 14 will rock within the tubing or coupling, as the case may be, with the cylindrical pad 20 exerting upward pressure against the outer end of the engaged piece. Simultaneously with the exertion of said upper pressure by the cushion 20, the saddle 24 will be exerting a downward pressure upon the object being handled.

The use of a cylindrical pad 20 of relatively soft, resilient material not only serves to protect the object being handled, but also assures that the object will be gripped by the lower shank 14, without possibility of relative slippage between the lower shank and said object. This characteristic of the invention is obtained by utilizing a relatively elongated, cylindrical pad 20, which pad can engage the outer end of the object being handled at any location taken longitudinally of the pad.

It is also considered to be an important characteristic of the invention that the particular construction illustrated not only permits the handle to serve as a guard for the worker's hand, but also makes an eye, on which a rope or chain can be tied. Further, the construction allows the use of a pry bar, said bar being insertable in the space between the bight 12 and cross bar 16, and being usable whether positioned longitudinally of the device or transversely thereof.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a tube gripper for a length of tubing, a single piece of bar material having a pair of shanks in spaced parallel relation and a bight at one end of the shanks to rigidly connect the shanks together, said shanks being of unequal length, and a cross bar connected to and extending between said shanks intermediate their ends to keep the shanks in their spaced relation and to provide a guard for the hand holding the longer of said shanks as the gripper is applied to a length of tubing.

2. A tube gripper for a length of pipe, a single piece of bar material having a pair of shanks in spaced parallel relation and a bight at one end of the shanks to rigidly connect the shanks together, said shanks being of unequal length, and a cross bar connected to and extending between said shanks intermediate their ends to keep the shanks in their spaced relation and to provide a guard for the hand holding the longer of said shanks as the gripper is applied to a length of tubing, a saddle secured on the end of the longer shank opposite the bight for engaging the exterior wall of the tubing to be gripped, and a pad of resilient material on the end opposite the bight of the shorter of said shanks adapted to engage the interior wall of the length of tubing to be gripped.

3. A tube gripper for a length of pipe, a single piece of bar material having a pair of shanks in spaced parallel relation and a bight at one end of the shanks to rigidly connect the shanks together, said shanks being of unequal length, and a cross bar connected to and extending between said shanks intermediate their ends to keep the shanks in their spaced relation and to provide a guard for the hand holding the longer of said shanks as the gripper is applied to a length of tubing, a saddle secured on the end of the longer shank opposite the bight for engaging the exterior wall of the tubing to be gripped, said saddle including a plurality of longitudinally spaced serrated plates removably carried by said saddle and a pad of resilient material on the end opposite the bight of the shorter of said shanks adapted to engage the interior wall of the length of tubing to be gripped.

4. A tube gripper for a length of pipe, a single piece of bar material having a pair of shanks in spaced parallel relation and a bight at one end of the shanks to rigidly connect the shanks together, said shanks being of unequal length, and a cross bar connected to and extending between said shanks intermediate their ends to keep the shanks in their spaced relation and to provide a guard for the hand holding the longer of said shanks as the gripper is applied to a length of tubing, a saddle secured on the end of the longer shank opposite the bight for engaging the exterior wall of the tubing to be gripped and a pad of resilient material comprising a sleeve circumposed about the end opposite the bight of the shorter of said shanks adapted to engage the interior wall of the length of tubing to be gripped.

References Cited in the file of this patent

UNITED STATES PATENTS

| Number | Name | Date |
| --- | --- | --- |
| 2,378,454 | Werling | June 19, 1945 |
| 2,599,938 | Price et al. | June 10, 1952 |
| 2,605,128 | Schneider | July 29, 1952 |